Patented Mar. 7, 1950

2,500,121

UNITED STATES PATENT OFFICE 2,500,121

COPOLYMERS OF 2-SUBSTITUTED-1-ACYL-OXYBUTADIENE-1,3 COMPOUNDS

Joseph B. Dickey, Rochester, N. Y., Norman J. Bowman, Gary, Ind., and Clarence G. Stuckwisch, Wichita, Kans., assignors to Eastman Kodak Company, Rochester, N. Y., a corporation of New Jersey No Drawing. Application February 9, 1946, Serial No. 646,708

2 Claims. (Cl. 260—85.5)

This invention relates to polymers of substituted 1-acyloxy butadienes and to a process for their preparation. More particularly, it relates to copolymers obtainable by polymerizing a mixture of a 1-acyloxy butadiene-1,3, wherein the 2-position is substituted by a halogen atom, an alkyl or aryl group, and one or more polymerizable monomeric vinyl compounds.

The copolymers of our invention are prepared by copolymerizing a diene having the general formula:

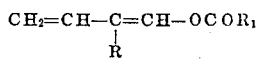

wherein R represents a halogen atom such as chlorine, bromine, fluorine, an alkyl group, for example; methyl, ethyl, propyl, butyl, isopropyl, amyl, phenyl and phenyl group substituted in the free positions by one or more halogen, nitro, alkyl, sulfonamide or other simple monovalent atom or groups, and $R_1$ represents an alkyl, an aryl group, a furyl group, and a substituted alkyl group, for example, alkyl group substituted by a lower alkyl ether group or by one or more halogen atoms, with a polymerizable monomeric vinyl compound, for example, styrene or derivatives thereof, isobutylene, ethylene, butene-1, butene-2, butadiene, 2-chlorobutadiene, 2 chloro-3-methylbutadiene, vinyl acetate, vinyl chloride, vinyl ketones, vinyl methyl ketone, vinyl alkylsulfones, vinyl ethylsulfone, vinyl sulfonamide, vinyl ethyl ether, amides, esters and half-nitriles of fumaric and maleic acids, maleic imide, acrylonitrile, α-methacrylonitrile and amides of acrylonitriles, vinyl urethanes and other similar kinds of monomeric unsaturated compounds. The above described copolymers are valuable intermediates for chemical reactions, and also as materials from which can be prepared useful coating and sheet forming compositions.

The polymerization reactions are promoted by means of heat, with or without a catalyst, and can be carried out in various manners. For example, the compounds to be copolymerized can be polymerized either with or without the presence of an inert diluent such as heptane, benzene, acetic acid, dioxane, water or polymerized in the form of an emulsion or beads. The process of polymerization takes place over a wide temperature range, but usually from about 40° C. to about 200° C., although temperatures outside this range can also be employed. Pressures up to and in excess of 1000 atmospheres yield useful products. The reacting ratio of the acyloxydiene compound to the vinyl compound is not critical, since copolymeric products can be obtained with practically any ratio, the copolymers varying somewhat in properties in accordance with the amount of the respective groups contained in the resin molecule. The preferred resinous copolymers of the invention are obtained with starting mixtures having from about 5 to 95 molecular parts of the specified acyloxydiene compound and from about 95 to 5 molecular parts of the monomeric vinyl compound. The catalyst can be an organic peroxide, for example, benzoyl peroxide, acetyl peroxide, urea peroxide, or inorganic catalysts such as boron trifluoride, ammonium persulfate or other similar kinds of polymerization promoting compounds.

The intermediate acyloxydienes employed in practicing our invention can be prepared, for example, by treating alpha-alkyl substituted or alpha-halo substituted crotonaldehydes or alpha and beta substituted acroleins with isopropenyl acetate or with an organic acid anhydride such as acetic, propionic, butyric, benzoic, furoic, methoxyacetic, succinic, trifluoroacetic or trichloroacetic anhydrides, the product in each case being the corresponding acyloxydiene derivative. The preparation of the 1-acyloxy-2-alkylbutadienes are described and claimed in copending application in the name of J. B. Dickey and C. G. Stuckwisch, Serial No. 646,709, filed of even date herewith (now United States Patent 2,432,394, dated December 9, 1947). The alpha-halogenated crotonaldehydes can be prepared by the general method described in German Patent 559,329, the alpha-alkyl crotonaldehydes by the general method described in Canadian Journal of Research, 6 284 (1932), and alpha-alkylacroleins by the method described in Annalen, 434 145 (1923).

It is, accordingly, an object of our invention to provide new copolymers of 2-substituted-1-acyl-oxybutadiene-1,3 compounds. Another object is to provide a method for preparing the same. Other objects will become apparent hereinafter.

The following examples will serve to illustrate our new polymers and the manner of their preparation.

*Preparation of 1-acetoxy-2-chlorobutadiene-1,3*

105 grams of alpha-chloro crotonaldehyde, 100 c. c. of acetic anhydride, 50 grams of sodium acetate and 3 grams of copper acetate were heated on a steam bath for a period of about 8 hours and then poured into 250 c. c. of water and allowed to stand overnight. The lower heavy layer was separated, dried with anhydrous sodium sulfate and distilled. There were recovered 30 grams of the unchanged alpha-chlorocrotonaldehyde in the first part of the distillate, and 40 grams of 1-acetoxy-2-chlorobutadiene-1,3 at 60-65° C. and at 25 mm. pressure in the middle portion of the distillate. By substituting other anhydrides for the acetic acid such as propionic, butyric, benzoic, trifluoroacetic, trichloroacetic, and the like, there can be obtained the corresponding esters. In place of alpha-chlorocrotonaldehyde in the above example, there can be substituted alpha-bromocrotonaldehyde or alpha-fluorocrotonaldehyde to obtain diene esters corresponding to these intermediates.

Example I.—Poly-1-acetoxy-2-methyl butadiene-1,3

3 grams of 1-acetoxy-2-methylbutadiene-1,3 were placed in a sealed tube with 0.0003 gram of benzoyl peroxide. The tube was placed in an oven at 110° C. for a period of about 3 weeks. Approximately 1 gram of the solid polymer was obtained.

Example II.—Copolymer of 1-acetoxy-2-methyl butadiene-1,3 and methyl methacrylate 1 gram (equiv. to 44 molecular parts) of methyl methacrylate and 1 gram (equiv. to 56 molecular parts) of 1-acetoxy-2-methylbutadiene-1,3 were heated in a sealed tube at 50° C. in the presence of benzoyl peroxide. After 24 hours heating there was obtained one gram of the solid copolymer. Analysis of the product gave 59.22 per cent by weight carbon and 8.60 per cent by weight of hydrogen as compared with theoretical of approximately 63.5 per cent carbon and 8.0 per cent hydrogen. According to this analysis, 93.4 per cent by weight of the theoretical amount of carbon is accounted for, and if the higher hydrogen found is assumed to be partly due to water, then the value of the carbon accounted for approaches closer to 100 per cent theoretical. The analysis indicates, therefore, that the product obtained was substantially a copolymer of 1-acetoxy-2-methyl butadiene-1,3 and methyl methacrylate, the units of the respective compounds being present in the polymer molecule in the approximate proportions of the starting mixture of monomeric compounds.

In a similar manner, and by substituting other vinyl compounds in place of the methyl methacrylate in the above example, there were obtained with acrylonitrile a copolymer which was mostly insoluble in acetone, but yielded on extraction 10 per cent resin soluble in acetone; with isopropyl methacrylate at 50° C., a yield of about 50 per cent of the copolymer corresponding thereto; and with N,N-diethyl acrylamide at 110° C. a yield of about 30 per cent of solid copolymer.

Example III.—Copolymer of 1-propionoxy-2-phenylbutadiene-1,3 and vinyl chloride 8 grams (equiv. to 55.3 molecular parts) of 1-propionoxy-2-phenyl butadiene-1,3 and 2 grams (equiv. to 44.7 molecular parts) of vinyl chloride were emulsified in about 25 c. c. of water using 4-5 parts of Nekal BX as emulsifier. Then there was added 0.07 part sodium pyrophosphate, 0.2 part of gelatin, 0.01 part of amyl alcohol and 0.04 part of sodium persulfate. The temperature was maintained at 48-55° C., while shaking vigorously. When polymerization was complete, the rubber-like polymer was isolated from the solution by precipitation with ammonium sulfate.

Example IV.—Copolymer of 1-acetoxy-2-chlorobutadiene-1,3 and acrylonitrile 15 grams (equiv. to 26.6 molecular parts) of 1-acetoxy-2-chlorobutadiene-1,3, 15 grams (equiv. to 73.4 molecular parts) of acrylonitrile and .1 gram benzoyl peroxide were polymerized at 60° C. in a nitrogen filled tube. The polymerization was complete in about 4 days. The tough elastic product obtained had a ratio of 1 part of the diene radicals to 2 parts of the acrylonitrile radicals in the molecule. In place of $\alpha$-methyl acrylonitrile, there can be substituted in the above example, methyl methacrylate N-butyl maleic imide, $\alpha$-methyl acrylonitrile or $\alpha$-chloro-acrylonitrile to obtain similarly useful resinous solids.

Example V.—Copolymer of 1-propionoxy-2-bromobutadiene-1,3 and vinyl chloride 15 grams (equiv. to 5.1 molecular parts) of 1-propionoxy-2-bromobutadiene-1,3, 85 grams (equiv. to 94.9 molecular parts) of vinyl chloride, 3.5 grams of sulfonated oleic acid, 2.0 grams of methyl cellulose, 2.8 grams of benzoyl peroxide and 275 c. c. of water were mixed into an emulsion, and polymerized at 55-60° C. for a period of about seven days. The polymer was isolated from the reaction mixture by precipitation with ammonium sulfate.

Example VI.—Copolymer of 1-acetoxy-2-chlorobutadiene-1,3 and isobutylene 2 grams (equiv. to 1.5 molecular parts) 1-acetoxy-2-chlorobutadiene-1,3, and 50 grams (equiv. to 98.5 molecular parts) of isobutylene were polymerized at —50 to —80° C., using boron trifluoride. A tough vulcanizable polymer was obtained. In place of 1-acetoxy-2-chlorobutadiene-1,3, there can be substituted in the above example other diene compounds, for example, 1-acetoxy-2-fluorobutadiene-1,3, 1-acetoxy-2-methylbutadiene-1,3, 1-acetoxy-2-ethylbutadiene-1,3, 1-acetoxy-2-phenyl butadiene-1,3, or 1-acetoxy-2-p-anisyl butadiene-1,3.

Example VII.—Copolymer of 1-acyloxydienes and butadiene 25 grams (equiv. to 62.1 molecular parts) of 1-acetoxy-2-methylbutadiene-2,3, 25 grams (equiv. to 37.9 molecular parts) 1-benzoyl-2-chlorobutadiene-1,3, 250 c. c. water and 5 grams of Nekal BX were shaken together. Then 1.4 grams of sodium pyrophosphate, 4 grams of gelatin, 0.2 gram of amyl alcohol and 0.8 gram of sodium persulfate were added. The mixture was stirred at about 55° C., until emulsification was complete. The rubber-like polymer was isolated by precipitation with ammonium sulfate.

Example VIII.—Copolymer of 1-acetoxy-2-methylbutadiene-1,3 and ethylene 1 gram (equiv. to 45 molecular parts) of 1-acetoxy-2-methylbutadiene-1,3 and 3 grams (equiv. to 55 molecular parts) of ethylene were charged into an autoclave and slowly heated until a temperature of about 200° C., and a pressure of about 3000 atmospheres was reached. Nitrogen was used as booster gas. A tough, vulcanizable elastomer was obtained. In place of ethylene, there can be substituted in the above example propylene, butene-1 or butene-2.

The copolymers of the above examples are thermoplastic elastomers which can be extruded in the form of wires, rods, tubes, and sheets, or molded by compression or injection processes, Fillers, coloring materials and plasticizers can be added. In the usual practice, the polymer is first softened by heat or chemical softening agents, fillers added as desired, and then kneaded, rolled, vulcanized, compressed or drawn under normal or heated conditions. The copolymers of the invention can also be transformed into compositions suitable for coatings and sheeting materials.

What we claim is:

1. A copolymer derived by the polymerization of a mixture of 26.6 molecular parts of 1-acetoxy-2-chlorobutadiene-1,3, and 73.4 molecular parts of acrylonitrile, the said diene compound and said acrylonitrile being the sole polymerizable compounds in the mixture.

2. The process which comprises heating, in the presence of benzoyl peroxide, a mixture of 26.6 molecular parts of 1-acetoxy-2-chlorobutadiene-1,3 and 73.4 molecular parts of acrylonitrile, the said diene compound and said acrylonitrile being the sole polymerizable compounds in the mixture.

JOSEPH B. DICKEY.
NORMAN J. BOWMAN.
CLARENCE G. STUCKWISCH.

REFERENCES CITED

The following references are of record in the file of this patent:

UNITED STATES PATENTS

| Number | Name | Date |
|---|---|---|
| 2,073,363 | Carothers | Mar. 9, 1937 |
| 2,195,382 | Slagh | Mar. 26, 1940 |
| 2,432,460 | Unruh | Dec. 9, 1947 |